Dec. 29, 1925.

L. W. CHUBB

RECTIFIER

Filed Dec. 2, 1920

1,567,573

WITNESSES:

INVENTOR
Lewis Warrington Chubb
BY
ATTORNEY

Patented Dec. 29, 1925.

1,567,573

UNITED STATES PATENT OFFICE.

LEWIS WARRINGTON CHUBB, OF EDGEWOOD PARK, PENNSYLVANIA, ASSIGNOR TO WESTINGHOUSE ELECTRIC & MANUFACTURING COMPANY, A CORPORATION OF PENNSYLVANIA.

RECTIFIER.

Application filed December 2, 1920. Serial No. 427,762.

*To all whom it may concern:*

Be it known that I, LEWIS WARRINGTON CHUBB, a citizen of the United States, and a resident of Edgewood Park, in the county of Allegheny and State of Pennsylvania, have invented a new and useful Improvement in Rectifiers, of which the following is a specification.

My invention relates to means for the production of unidirectional electromotive forces, and particularly to certain modifications on the high-voltage-producing means described in a prior application by Joseph Slepian, Serial No. 316,170, filed August 8, 1919, and assigned to the Westinghouse Electric & Manufacturing Company.

The above mentioned prior application shows a square-shaped bridge arrangement supplied from a two-phase source through suitable rectifiers, the arms of said bridge being alternately energized from the respective phases of said source. The load is connected across one diagonal of the bridge to receive the sum of the currents in the respective phases while an equivalent balancing impedance is connected across the other diagonal of the bridge to receive the difference between the currents in the respective phases. With such system, it is possible to cause the currents in each phase to fall to zero value before the reversal of connections thereto, thus making the system particularly adaptable for the rectification of extremely high voltages, such as are used in electrical precipitation.

According to my invention, an alternating-current source, having a wave form of peculiar shape hereinafter described, is employed, whereby the ripples in the rectified load current are entirely eliminated. In this manner, I avoid the unnecessary excess of energy over the minimum required energy, which corresponds to the lowest point of the voltage curve, and also avoid other objectionable effects of the peaks in the rectified electromotive force, as, for example, the noise often encountered in battery-charging service. The constant rectified current thus obtained is useful not only in precipitation work, but also in battery-charging work, as above pointed out, and particularly in connection with telephone radio and battery systems, wherein it has heretofore been necessary to employ large choke coils to eliminate the ripple in the battery charging current, and in the plate current of a vacuum tube.

The objects and nature of my invention will be apparent from the following detailed description and appended claims, when read in connection with the accompanying drawings, wherein:—

Figure 1:
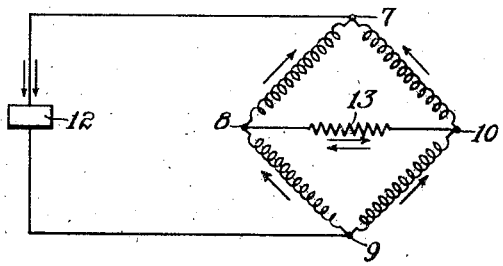
Figure 1 is a simplified diagrammatic sketch illustrative of a bridge system of the character employed by me.

Referring to the drawing for a more detailed understanding of my invention, a bridge 7—8—9—10 is shown in Fig. 1, having a load 12 connected across diagonal 7—9 thereof and an equivalent impedance device 13 connected across the remaining diagonal thereof. It is assumed that the coils shown in each arm of the bridge are the seats of electromotive forces in the direction indicated by the adjacent arrows.

The arms 9—10 and 8—7 are energized from one phase of the supply, while the arms 9—8 and 10—7 are energized from the other phase of the supply. It will be seen that the diagonal 8—10 has an electromotive force which is equal to the difference between the electromotive forces in the respective phases, while the diagonal 7—9 has an electromotive force which is equal to the sum of the electromotive forces in the respective phases.

Figure 3:
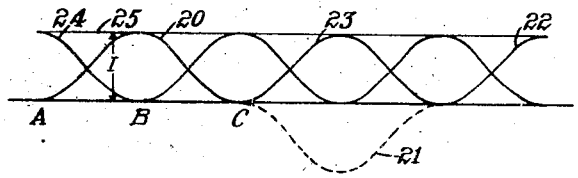
Figs. 3 and 4 are diagrams illustrative of the action of the system of Fig. 2.

According to my invention, I utilize a supply wave of frequency $\frac{f}{2}$, such as the wave 20, 21, 22, in Fig. 3 which, when rectified, gives a sine wave, such as 20, 23, 22 of frequency $f$, said sine wave being displaced so as to lie entirely on one side of the axis. The advantage of this arrangement is immediately seen when the corresponding rectified wave of the other phase, as indicated at 24, in Fig. 3, is considered. The sum of these two waves gives an absolutely straight line for the rectified current, as indicated at 25.

The analysis of the supply wave referred to is as follows:

$$I = .98 \sin \Theta - .199 \sin 3\Theta - .027 \sin 5\Theta - .013 \sin 7\Theta + .003 \sin 9\Theta.$$

This is a curve containing approximately:—
98% fundamental.
20% third harmonic.
3% fifth harmonic.
1% seventh harmonic.

Any suitable means may be employed for generating an alternating current having the wave form specified.

Figure 2:
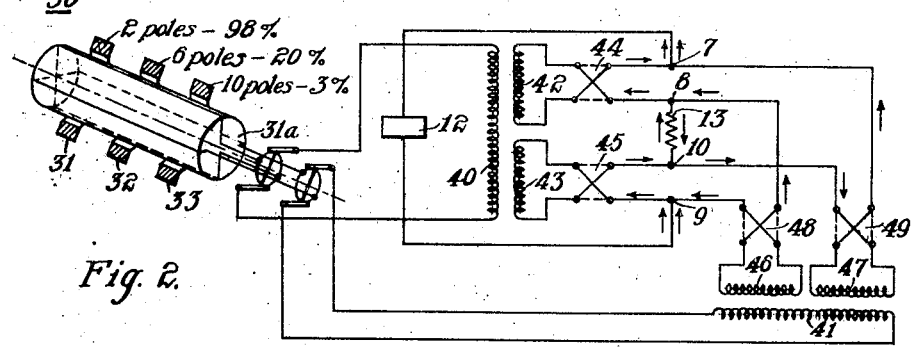
Fig. 2 is a diagrammatic showing of a rectifier system operating upon the principles illustrated in Fig. 1 and including a polyphase generator of special wave form.

As an example of such means, a general form of special wave-form generator is shown at 30 in Fig. 2, wherein a two-phase armature 31ª is subjected to the influence of three separate and independent field windings which may be mounted on separate field frames, indicated at 31, 32 and 33. Each of the windings just mentioned is adapted to be energized from a suitable source of direct-current.

Field member 31 has a two-pole winding, with an excitation equal to 98% of the excitation necessary to produce a sine wave having the desired maximum value. Field members 32 and 33 have, respectively, six-pole and ten-pole windings, with excitations of 20% and 3%, respectively. The generator will have a wave form closely approximating that shown in Fig. 3 at 20, 21, 22. If a closer approximation is desired, additional field windings having fourteen poles, eighteen poles, etc., may be added.

Referring to Fig. 2, the two-phase current is fed to the primaries of transformers 40 and 41, respectively, each of said transformers having two secondary windings corresponding to the bridge arms of Fig. 1. Secondary windings 42 and 43 of transformer 40 are connected to the switches indicated at 44 and 45 for reversing the currents in said windings. Secondary windings 46 and 47 of transformer 41 are connected to similar switches 48 and 49.

The operation of the device is as follows: At a given instant, indicated at A in Fig. 3, the current waves in coils 46 and 47 will be just starting to increase from zero value, with the left-hand terminals of the coils positive. At the same time, switches 48 and 49 will have just moved into the positions indicated by full lines. In coils 42 and 43, however, the current will be just starting to decrease from maximum value, with the lower terminals of the coils positive. Switches 44 and 45 will be in the positions indicated by full lines. The current flow is indicated by the arrows in Fig. 2.

A quarter of a cycle later, indicated at B in Fig. 3, the polarity of coils 42 and 43 will be reversed, switches 44 and 45 will be moving to the dotted-line position, and the current will then continue to flow in the directions indicated by the arrows. At the end of another quarter of a cycle, indicated at C in Fig. 3, the polarity of coils 46 and 47 will be reversed, switches 48 and 49 will be moving to the dotted-line position, and the current will then continue to flow in the direction indicated by the arrows. This operation is repeated for each succeeding half-wave, the switches 44, 45 and 48, 49 alternately changing positions at each succeeding quarter cycle.

Figure 4:
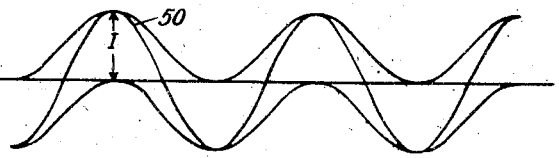

The efficiency of the system will be apparent by comparing Figs. 3 and 4. In Fig. 3, the sum of the rectified currents is plotted, as indicated by line 25, showing a constant current of value I. In Fig. 4, the difference between the rectified currents is plotted, as indicated by curve 50, which is a sine curve having a maximum value equal to I.

The power consumed by the differential current is thus seen to be one-half the power consumed by the load current, thus representing an energy loss of 33% of the total power supplied. This loss is entirely permissible in many instances wherein the necessity for high-voltage, unidirectional electromotive forces is extremely urgent, as, for example, in precipitation systems, radio systems, and X-ray systems. This loss may also be permissible in battery-charging installations for charging telephone batteries while in service, as previously pointed out. Of course, this energy loss may be avoided by applying the differential current to some useful service, such as lighting or heating.

While I have shown my invention, for simplicity and clearness, as having a quarter-phase supply, it is nevertheless equally susceptible of application to any number of phases. In like manner, switches 44, 45, 48 and 49 are intended to indicate any form of rectifying device utilizing both half-waves of the alternating-current supply.

While I have shown my invention in its preferred form, it will be obvious to those skilled in the art that it is not so limited but is susceptible of various minor changes and modifications without departing from the spirit thereof, and I desire, therefore, that only such limitations shall be placed thereupon as are imposed by the prior art or are specifically set forth in the appended claims.

I claim as my invention:—

1. In a rectifying system, the combination with means for supplying two groups of electromotive forces of relatively displaced-phase relation, of a common current path therefor, and means for causing the electromotive forces to be mutually additive in one portion of said path and to be mutually subtractive in another portion thereof, said supply means having a wave-form adapted to produce a rectified current having a substantially sinusoidal wave-form.

2. In a rectifying system, the combination with a polyphase supply means, of rectifying means for each phase of the supply, whereby differing systems of unidirectional current impulses are provided, and means for cumulatively combining said impulses in one portion of an electric circuit and for differentially combining said impulses in another portion of said circuit, said polyphase supply having a wave-form which analyzes substantially as follows:

$.98 \sin \Theta - .199 \sin 3\Theta - .027 \sin 5\Theta.$

3. In a rectifying system, the combination with a polyphase supply means, of rectifying means for each phase thereof, a load circuit including rectifying means of all of the different phases in series, and means for permitting each individual rectified impulse of the several phases to fall to substantially zero current value before the reversal of the connections thereto, said polyphase supply having a wave-form adapted to produce a rectified current having a substantially sinusoidal wave-form.

4. In a rectifying system, the combination with a bridge, of a load connected across one diagonal thereof, an auxiliary impedance device connected across another diagonal thereof, means for producing substantially sinusoidal wave-form, unidirectional current-impulses of like phase in two opposite arms of said bridge, and means for producing substantially sinusoidal wave-form, unidirectional current-impulses of like phase to each other but of displaced phase with respect to said first mentioned impulses in the remaining two arms of said bridge, whereby said current-impulses are cumulatively combined in said load circuit and differentially combined in said auxiliary impedance device.

5. In a rectifying system, the combination with means constituting a bridge, of a load circuit connected across one diagonal of said bridge, an auxiliary impedance device having an impedance equivalent to that of said load connected across the remaining diagonal of the bridge, means for producing similar sine-wave, cophasial, unidirectional-current impulses in oppositely disposed arms of said bridge, means for further producing similar sine-wave, current-impulses of displaced phase with respect to said first mentioned impulses in the remaining arms of said bridge, all of said current-impulses being similarly directed with respect to said load circuit, whereby the current-impulses are cumulatively combined in the load circuit and differentially combined in the auxiliary impedance device.

6. In a rectifying system, the combination with a quarter-phase supply circuit, having a wave-form containing approximately 98% fundamental, 20% third harmonic, 3% fifth harmonic, and 1% seventh harmonic, of two transformers arranged to have their primary windings energized from the two phases thereof, respectively, each of said transformers having two secondary windings, current connections for forming a bridge from said secondary windings associated with the respective phases alternating in said bridge, rectifying means associated with each of said secondary windings, a load circuit connected across one diagonal of said bridge, and an auxiliary impedance device connected across the remaining diagonal of the bridge and having an impedance equivalent to that of said load circuit.

7. In a rectifying system, the combination with rectifying means, of a polyphase supply circuit having a wave-form such as to produce a rectified wave of substantially sine shape.

8. In a rectifying system, the combination with a polyphase supply, of rectifying means for each phase thereof, a load circuit including all of said rectifying means in series, and means permitting each rectified impulse to fall to substantially zero current value before the reversal of the connections thereto, said polyphase supply having a wave-form adapted to produce a substantially constant rectified current in said load circuit.

9. The method of supplying a direct-current circuit which comprises so sending into said circuit a plurality of current wave trains of mutually displaced phases as to produce in said circuit a uniform direct current.

10. The method of supplying a direct-current circuit which comprises sending into said circuit rectified polyphase, alternating currents of such wave shapes and of such phase relation as to produce in said circuit a uniform direct current.

11. The combination with a four-phase system, of means for connecting said phases in a quadrilateral bridge circuit, a direct-current line connected to diametrically opposite points in said bridge circuit, means for causing the alternating voltages of said phases to be applied always in the same direction in each half of said bridge circuit whereby the two halves have a common positive terminal and a common negative terminal, and an alternating-current circuit joining an intermediate junction point between phases in one of said halves to an intermediate junction point between phases in the other of said halves, the alternating voltages of each of said phases being of such wave-form that, when alternate half-waves are reversed in direction, a unidirectional voltage of substantially sinusoidal waveform is produced.

12. The combination with a four-phase system, of means for connecting said phases in a quadrilateral bridge circuit, current-interrupting means for causing the alternating voltages of said phases to be applied always in the same direction in each half of said bridge circuit, whereby the two halves have a common positive terminal and a common negative terminal, and a resister connected between an intermediate junction point between phases in one of said halves and an intermediate junction point between phases in the other of said halves, said four-phase system having a wave-form which analyzes substantially as follows:

$.98 \sin \Theta - .199 \sin 3\Theta - .027 \sin 5\Theta$.

13. In a rectifying system, the combination with a quarter-phase supply circuit, having a wave-form containing approximately 98% fundamental, 20% third harmonic, 3% fifth harmonic, and 1% seventh harmonic, of means for connecting said phases in a quadrilateral bridge circuit, current-interrupting means for causing the alternating voltages of said phases to be applied always in the same direction in each half of said bridge circuit, whereby the two halves have a common positive terminal and a common negative terminal, a direct-current load connected between said positive and negative terminals, and an equivalent-resistance device connected between an intermediate junction point between phases in one of said halves and an intermediate junction point between phases in the other of said halves.

In testimony whereof, I hereunto subscribe my name this 30th day of November, 1920.

LEWIS WARRINGTON CHUBB.